(12) United States Patent
Murata

(10) Patent No.: US 10,118,126 B2
(45) Date of Patent: Nov. 6, 2018

(54) HONEYCOMB STRUCTURE

(71) Applicant: DENSO CORPORATION, Kariya, Aichi-pref. (JP)

(72) Inventor: Masakazu Murata, Kariya (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 15/271,561

(22) Filed: Sep. 21, 2016

(65) Prior Publication Data
US 2017/0080412 A1  Mar. 23, 2017

(30) Foreign Application Priority Data
Sep. 21, 2015  (JP) .................................. 2015-186139

(51) Int. Cl.
*B01D 46/24* (2006.01)
*B01D 53/94* (2006.01)

(52) U.S. Cl.
CPC .................................. *B01D 53/94* (2013.01)

(58) Field of Classification Search
None
See application file for complete search history.

(56) References Cited

U.S. PATENT DOCUMENTS

| 6,159,431 A | 12/2000 | Inoue et al. |
| 2014/0205794 A1 | 7/2014 | Tamai et al. |
| 2014/0287192 A1 | 9/2014 | Murata |
| 2015/0275726 A1* | 10/2015 | Tamai ..................... B01J 35/04 428/116 |

FOREIGN PATENT DOCUMENTS

JP  2014-180606  9/2014

* cited by examiner

*Primary Examiner* — David Sample
*Assistant Examiner* — Mary I Omori
(74) *Attorney, Agent, or Firm* — Nixon & Vanderhye P.C.

(57) ABSTRACT

A honeycomb structure has a cylindrical outer skin and a partition wall and a plurality of cells and a separator. A plurality of intersections intersecting the two partition walls each other are disposed in the outer skin. Some of the intersections are reinforced by the reinforcing part. Two angles $\theta 1$ and $\theta 2$ are formed by a radial direction of the outer skin and respective two partition walls intersecting with each other. A smaller of two angles $\theta 1$ and $\theta 2$ is larger than a predetermined angle $\theta_{th}$. Further, some of the reinforcing parts are respectively formed only on some of the intersections which are disposed in a vicinity of the separator.

3 Claims, 15 Drawing Sheets

HONEYCOMB STRUCTURE

CROSS-REFERENCE TO RELATED APPLICATION

This application is based on and claims the benefit of priority from earlier Japanese Patent Applications No. 2015-186139 filed on Sep. 21, 2015, the description of which is incorporated herein by reference.

TECHNICAL FIELD

This disclosure relates to a honeycomb structure used as a catalyst carrier to purify exhaust gases.

BACKGROUND

As shown in Japanese Unexamined Patent Application Publication No. 2014-136211, for example, there is known a honeycomb structure having partition walls as catalyst carriers to purify exhaust gases discharged from automobiles or the like. The partition wall has a polygonal lattice form. The honeycomb structure has a plurality of cells forming flow channels of the exhaust gases which are formed to be surrounded by the partition walls. The honeycomb structure is mounted in an exhaust pipe. When the high-temperature exhaust gases flow in the plurality of cells, a temperature of the partition wall rises, and catalyst carried on the partition wall is activated. Thereby, harmful substances in the exhaust gases are purified.

The plurality of cells are divided into inner and outer cells. The inner cells are formed on an inner part of the honeycomb structure, which is disposed around a central axis of the outer skin. The outer cells are formed outside of a region where the inner cells are formed. The individual opening areas of the inner cells are smaller than those of the outer cells. Thereby, a flow resistance of the exhaust gases in the inner cells is set to be larger than that of the outer cells to equalize a velocity of the respective exhaust gases in the inner and the outer cells. A separator is disposed between respective regions having the inner and the outer cells which are sectioned thereby. The separator is made up of the partition wall.

When the honeycomb structure is mounted in the exhaust pipe, the honeycomb structure, surrounded by a mat, is pressed into the exhaust pipe. Therefore, a large external force in a radial direction of the outer skin is applied to the honeycomb structure from the mat. So-called incomplete cells, which are surrounded by the partition walls and the separator, are formed in a vicinity of the separator. Therefore, when the honeycomb structure is pressed into the exhaust pipe, stress tends to concentrate on the separator and in its vicinity. That is to say, the separator and in its vicinity are the weakest against stress in the honeycomb structure. Therefore, in the honeycomb structure, while a thickness of the separator is increased so as to enhance a strength of the separator, the partition wall in the vicinity of the separator is thickly formed. Thereby, the strength of the entire honeycomb structure is enhanced, and the resistance to stress prevents the partition wall from being damaged.

However, in the honeycomb structure, when the thickness of the partition wall in the vicinity of the separator is increased, a weight of the honeycomb structure tends to increase. Therefore, it is possible to enhance the strength of the entire honeycomb structure, but the catalyst carried on the partition wall is heated and activated less quickly by the exhaust gases when increasing the weight of the honeycomb structure. Therefore, making a lighter-weight honeycomb structure is expected to activate the catalyst quickly.

Further, in the honeycomb structure, when the thickness of the partition wall in the vicinity of the separator is increased, opening areas of cells in the vicinity of the separator tend to be small. Therefore, the flow resistance of the exhaust gases becomes high, and pressure loss of the exhaust gases tends to increase.

In addition, after the honeycomb structure is produced, a process to form a catalyst layer on the partition wall is carried out by applying a catalyst slurry including noble metals to a surface of the partition wall. In the honeycomb structure, when the thickness of the partition wall in the vicinity of the separator is increased, the opening area of the cell in the vicinity of the separator tends to be small. Therefore, the cell is likely to be clogged by the catalyst. Therefore, the pressure loss of the exhaust gases tends to increase even more. Further, since the exhaust gases do not flow in the clogged cell, the catalyst in the clogged cell does not contribute to purifying the exhaust gases.

SUMMARY

An embodiment provides a honeycomb structure for which a high strength can be secured, capable of suppressing a size and a weight from increasing, and capable of suppressing a pressure loss of exhaust gases from excessively rising.

One aspect of this disclosure relates to a honeycomb structure including an outer skin, partition walls and a plurality of cells. The honeycomb structure purifies the exhaust gases. The outer skin has a cylindrical shape. The partition wall is formed in the outer skin and has a quadrangle lattice shape. The plurality of the cells form flow channels of the exhaust gases and are formed to be surrounded by the partition walls. The plurality of the cells is divided into inner and outer cells. The inner cells are formed in a region which is an inner part of the honeycomb structure and which includes a central axis of the outer skin. The outer cells are disposed outside of the region where the inner cells are formed. The opening area of an outer cell is larger than that of an inner cell. The region where the inner cell is formed and a region where the outer cell is formed are sectioned by a separator. There are a plurality of the separators. A plurality of intersections, each of which is formed by intersecting the two partition walls with each other, are disposed in the outer skin. Some parts of the plurality of the intersections are respectively reinforced by reinforcing parts. Two angles are formed by a radial direction of the outer skin and the respective two partition walls intersecting with each other. A smaller angle of the two angles is larger than a predetermined angle. Further, the reinforcing parts are respectively formed only on the intersections which are respectively disposed in a vicinity of the separator.

In the honeycomb structure, some of the reinforcing parts are respectively formed on the intersections which are respectively disposed in the vicinity of the separator. Thereby, the partition wall in the vicinity of the separator may be reinforced by the reinforcing part. Therefore, parts which are weakest against stress in the honeycomb structure may be reinforced, and the strength of the entire honeycomb structure may be enhanced. Further, when the reinforcing part is formed, the honeycomb structure may be made more light-weight since it is not necessary for a thickness of the partition wall in the vicinity of the separator to be increased. Further, when the reinforcing part is formed, the opening area of the cell may be inhibited from being small since the thickness of the partition wall in the vicinity of the bulkhead is not necessary to be increased. Therefore, the pressure loss of the exhaust gases may be inhibited from rising.

In the honeycomb structure, two angles are formed by the radial direction of the outer skin and the respective two partition walls intersecting with each other. The smaller angle of the two angles is larger than a predetermined angle. Further, the reinforcing parts are respectively formed only on the intersections which are respectively disposed in the vicinity of the separator. Therefore, while the number of the reinforcing parts is reduced, the strength of the honeycomb structure may be enhanced. That is to say, when an external force from outside of the honeycomb structure acts on one of the two partition walls forming the above-described two angles approximately in parallel with this partition wall, the two partition walls are hardly deformed. However, when a direction on which the external force from outer of the honeycomb structure acts crosses obliquely with either of the two partition walls intersecting with each other, the two partition walls are easily deformed. The external force tends to concentrate on the partition wall in the vicinity of the separator. That is to say, the partition wall in the vicinity of the separator which crosses obliquely with the direction on which the external force from outer of the honeycomb structure acts is particularly weak against the external force. Therefore, when the reinforcing part is formed only on the intersection in the vicinity of the separator, which is formed by intersecting the two partition walls each other, a strength of the only partition wall, which forms the intersection disposed in the vicinity of the separator, deformable by stress may be enhanced. The respective two partition walls intersecting with each other relative to the direction on which the external force acts (i.e. the radial direction of the outer skin) are arranged so as to cross with each other at an angle larger than the predetermined angle. Therefore, high strength of the honeycomb structure can be secured, and this structure is capable of suppressing increase in size and weight, and capable of suppressing a pressure loss of exhaust gases from excessively rising.

Thus, a present embodiment can provide the honeycomb structure which can be secured the high strength, and capable of suppressing increase in size and weight, and capable of suppressing the pressure loss of exhaust gases from excessively rising.

The above-described "the reinforcing part is formed only on the intersections in the vicinity of the separator" means the following. Each of intersections on which the non-reinforcing part is formed in the radial direction outside of each of intersections on which the reinforcing part is formed is defined as an intersection A. Each of intersections on which the non-reinforcing part is formed in the radial direction inside of each of the intersections on which the reinforcing part is formed is defined as an intersection B. The plurality of intersections are made up of the intersections A, the intersections B and the intersections on which the reinforcing part is formed.

DETAILED DESCRIPTION OF THE PREFERRED EMBODIMENTS

The above-described honeycomb structure may be the vehicle-mounted honeycomb structure for purifying exhaust gases of vehicles.

First Embodiment

Figure 1:
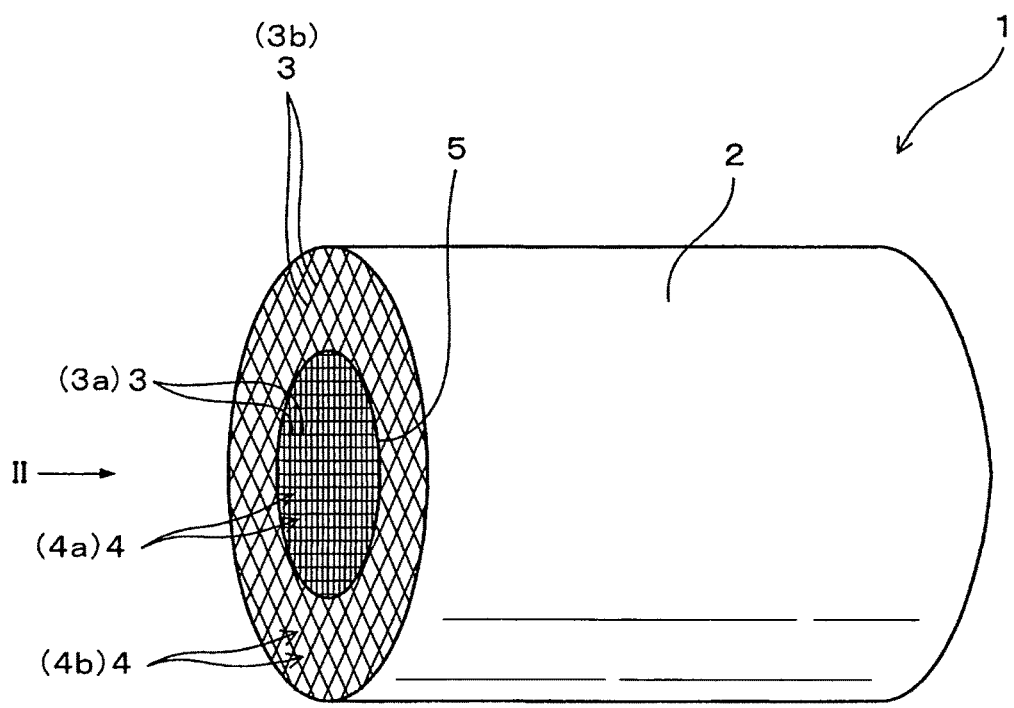
FIG. 1 is a conceptual diagram of a honeycomb structure according to a first embodiment of the present disclosure.
Figure 2:
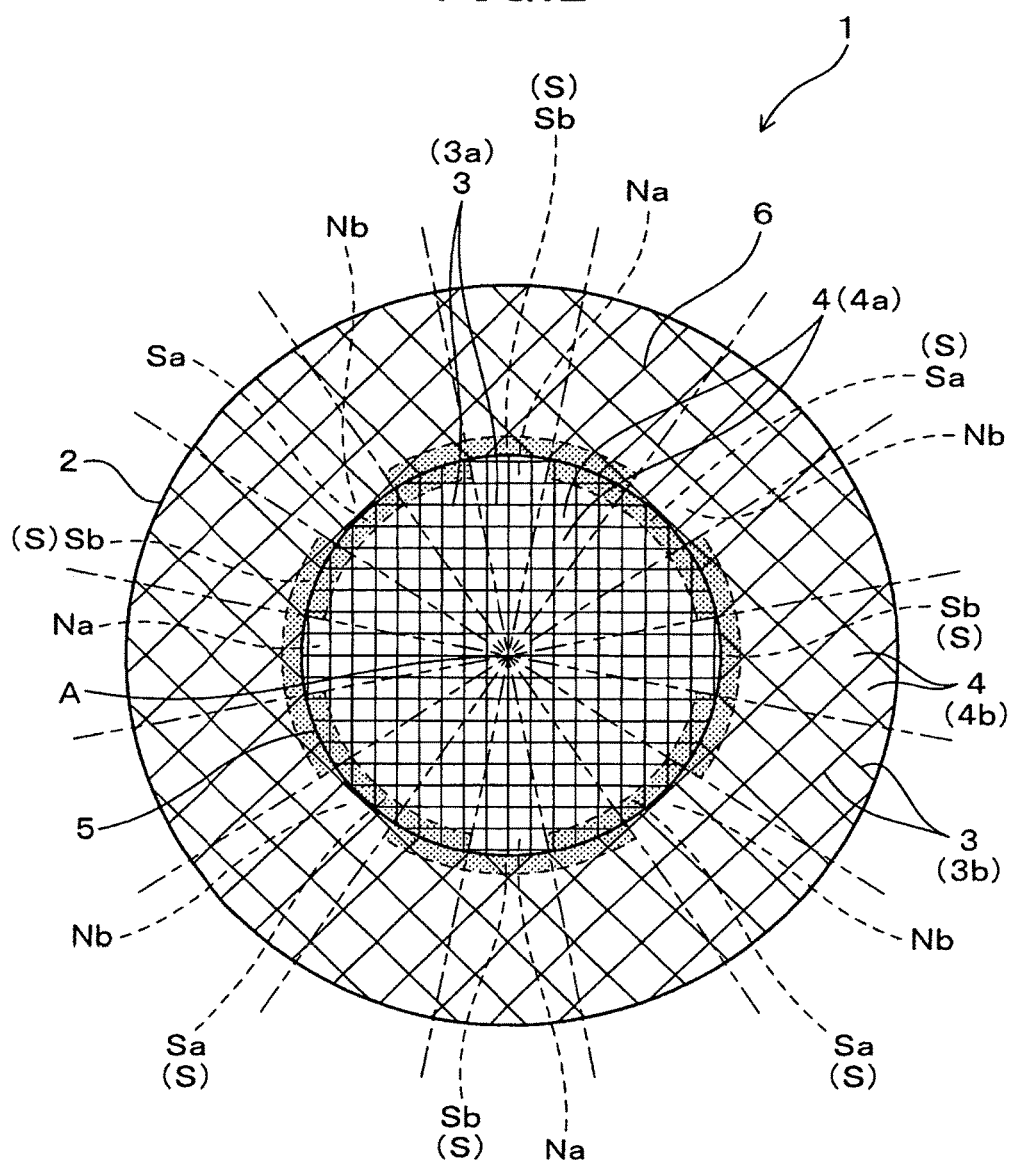
FIG. 2 is a figure of the honeycomb structure viewing in the direction of the arrow II of FIG. 1.

An embodiment regarding the above-described honeycomb structure is described below using FIG. 1 to FIG. 11. A honeycomb structure 1 according to a present embodiment is used for purifying exhaust gases g. The honeycomb structure 1 includes, as shown in FIG. 1 and FIG. 2, an outer skin 2, partition walls 3 and a plurality of cells 4. The outer skin 2 has a cylindrical shape. Some of the partition walls 3 are formed in the outer skin 2 and have a quadrangle lattice shape respectively. The plurality of the cells 4 form flow channels of the exhaust gases g and are formed to be surrounded by the partition walls 3.

The plurality of the cells 4 have inner cells 4a and outer cells 4b. Some of the inner cells 4a are formed in a region which is an inner part of the honeycomb structure and which includes a central axis A of the honeycomb structure. Some of the outer cells 4b are disposed outside of the region where the inner cells 4a are formed. An opening area of the outer cell 4b is larger than that of the inner cell 4a. The region where the inner cell 4a is formed and a region where the outer cell 4b is formed are sectioned by a separator 5.

Figure 4:
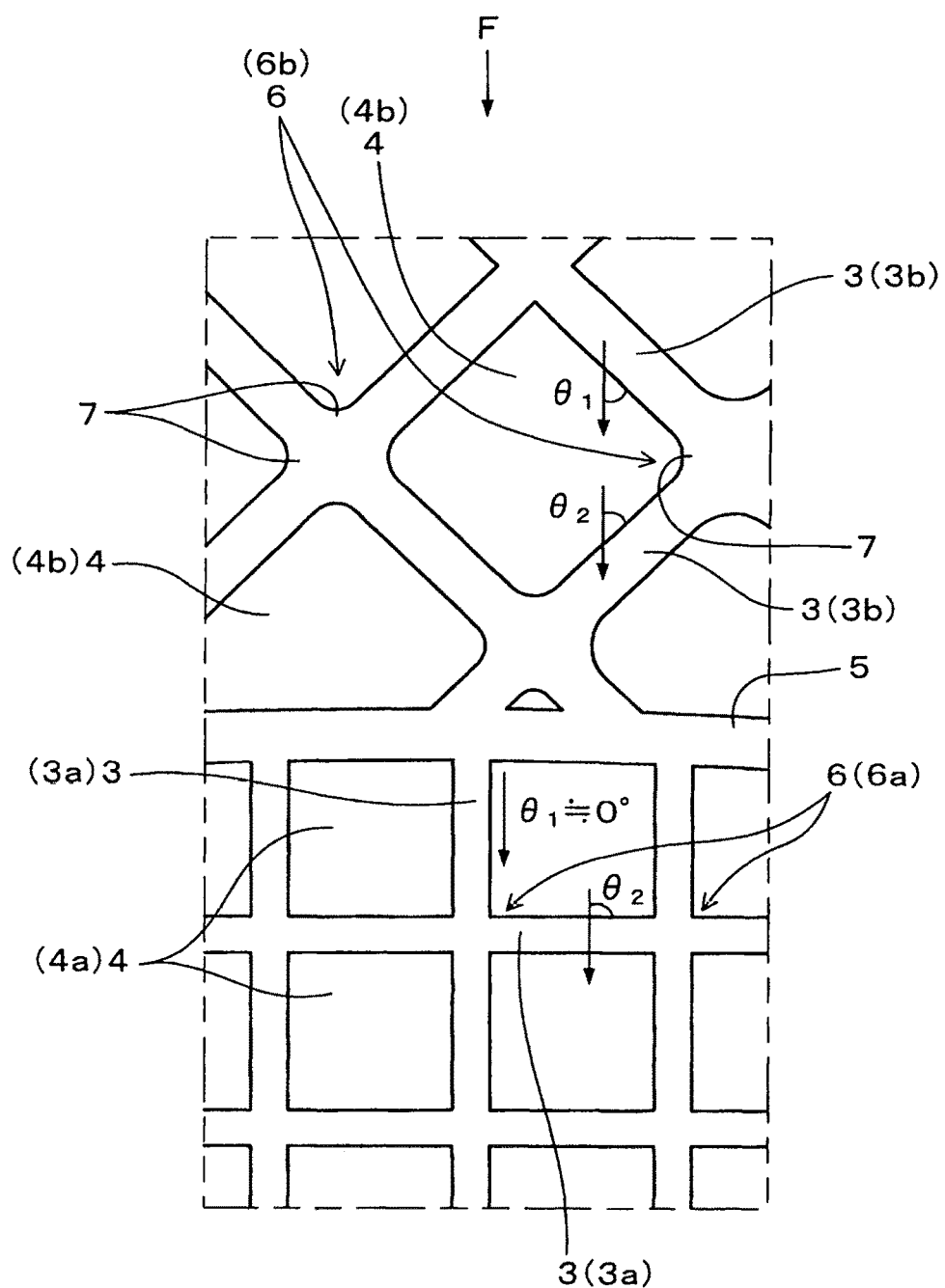
FIG. 4 is a partial enlarged sectional view of a portion where a reinforcing part is formed only on a partition wall which is outside of a separator of the honeycomb structure according to the first embodiment.
Figure 5:
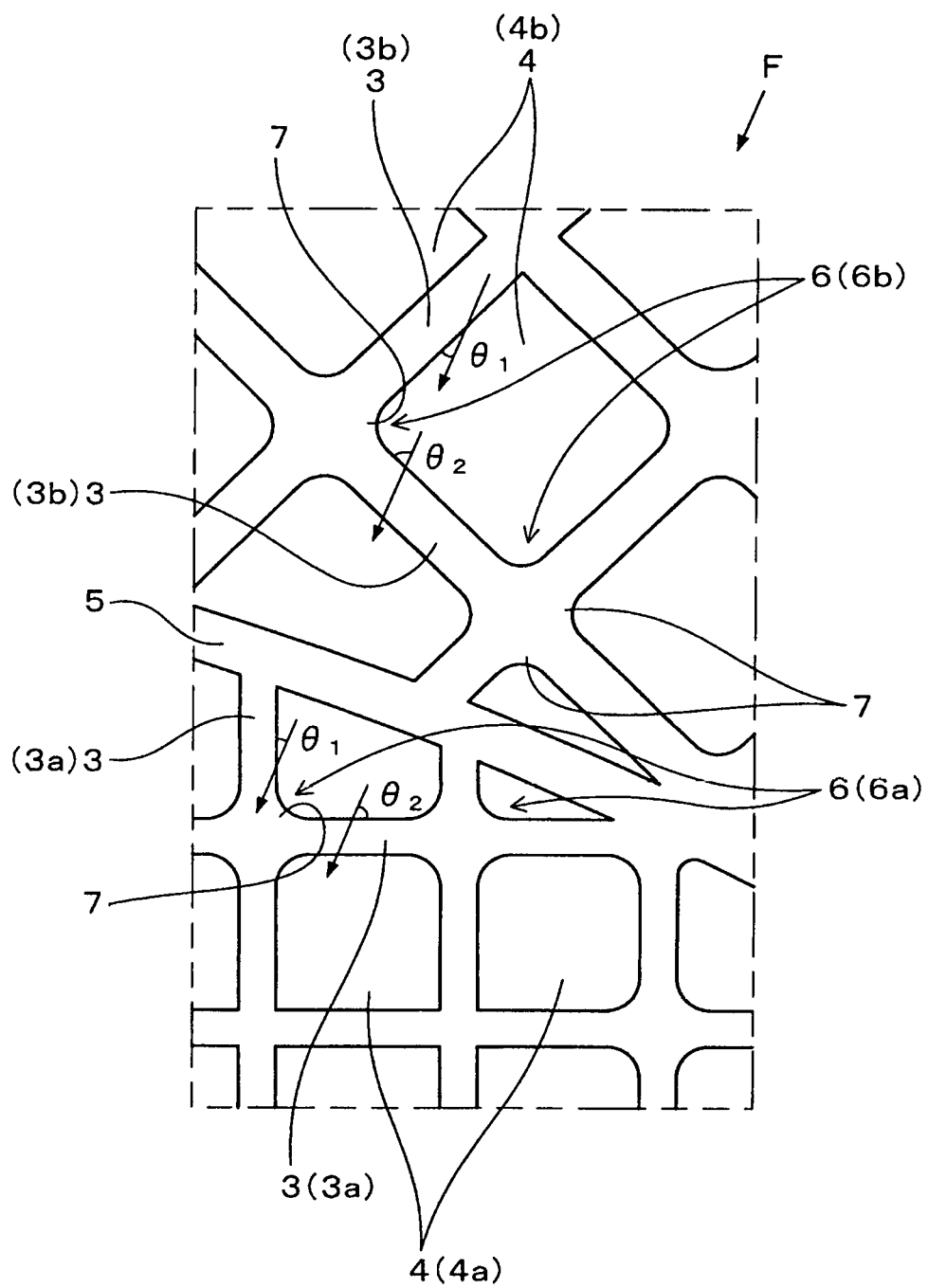
FIG. 5 is a partial enlarged sectional view of portions where the respective reinforcing parts are formed on the partition walls which are inside and outside of the separator of the honeycomb structure according to the first embodiment.
Figure 6:
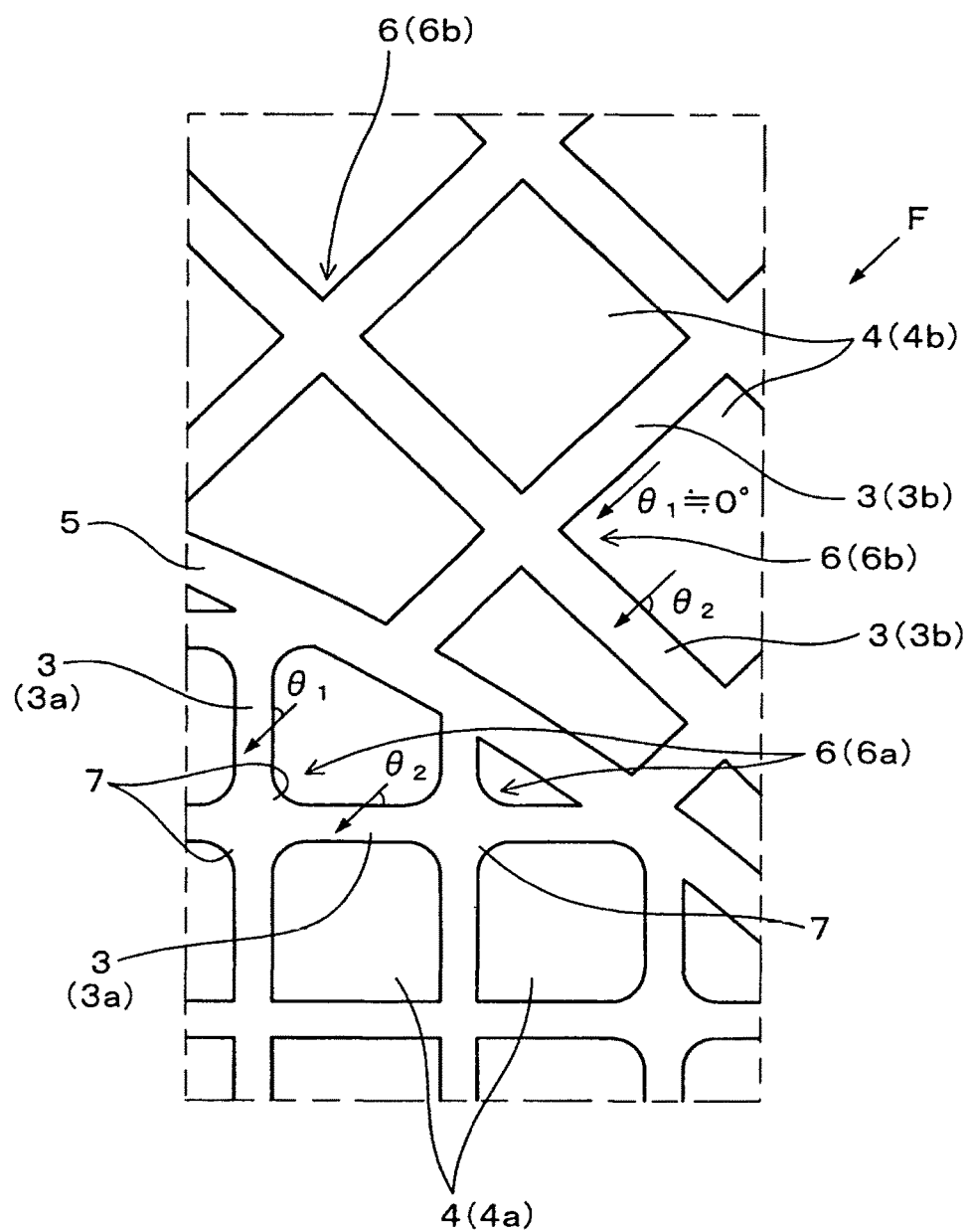
FIG. 6 is a partial enlarged sectional view of a portion where the reinforcing part is formed only on the partition wall which is inside of the separator of the honeycomb structure according to the first embodiment.

As shown in FIG. 2, a plurality of intersections 6, each of which is formed by intersecting the two partition walls 3 with each other, are disposed in the outer skin 2. As shown in FIG. 4 to FIG. 6, some parts of the plurality of the intersections 6 are respectively reinforced by reinforcing parts 7.

As shown in FIG. 4 to FIG. 6, two angles θ1 and θ2 are formed by a radial direction of the outer skin 2 and the respective two partition walls 3 intersecting with each other. A smaller angle of the two angles θ1 and θ2 is larger than a predetermined angle $\theta_{th}$. In addition, some of the reinforcing parts 7 are respectively formed only on some of the intersections 6 which are respectively disposed in a vicinity of the separator 5.

Figure 7:
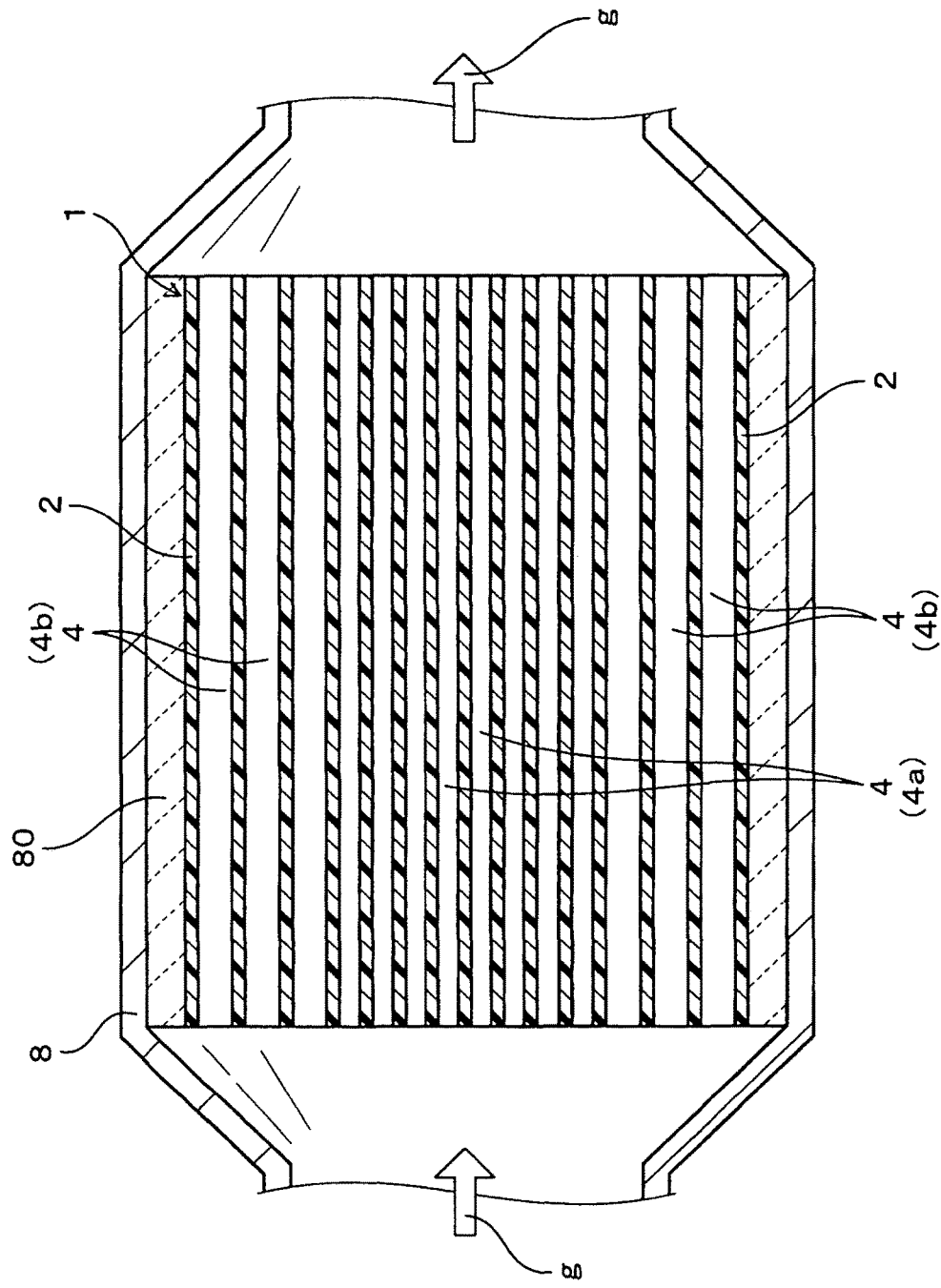
FIG. 7 is a cross-sectional view of the honeycomb structure which is mounted in an exhaust pipe according to the first embodiment.
Figure 8:
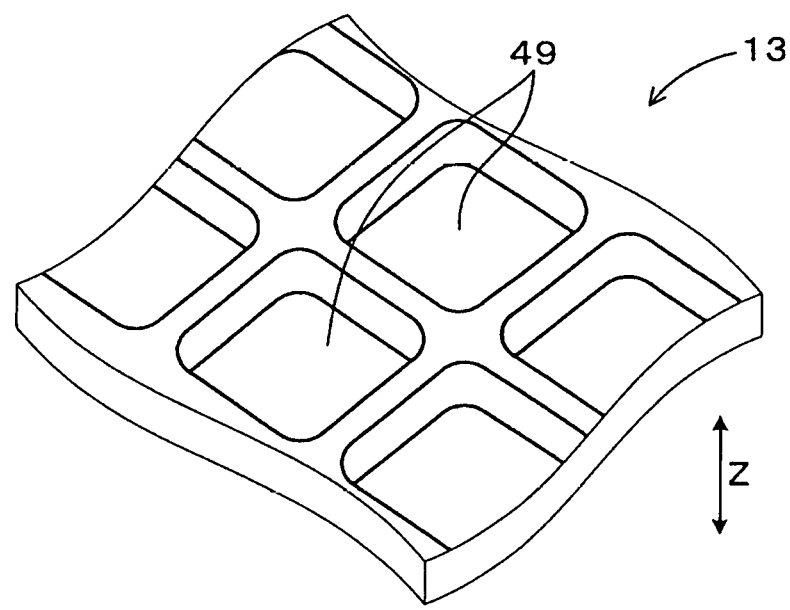
FIG. 8 is a partial perspective view of an electrode according to the first embodiment.

The honeycomb structure according to the present embodiment is used for purifying the exhaust gases g of the vehicles. The honeycomb structure is, as shown in FIG. 7, mounted in an exhaust pipe 8 of the vehicles. A mat 80 is disposed between the honeycomb structure 1 and the exhaust pipe 8. Since the honeycomb structure 1 is pressed into the exhaust pipe 8, an external force F in the radial direction thereof is applied to the honeycomb structure 1 from the mat 80.

The honeycomb structure is made up of porous material, such as a cordierite. The outer skin 2, the partition wall 3, the separator 5 and the reinforcing part 7 are integrally formed. Further, the separator 5 has a cylindrical shape.

A not shown catalyst-coat layer is applied to a surface of the partition wall 3. The catalyst-coat layer includes a noble metal, such as Pt or Pd. When the high-temperature exhaust gases g flow in the cells 4, the partition wall 3 is heated thereby. Therefore, a temperature of the partition wall 3 rises, and a heat of the partition wall 3 is transferred to catalyst consisting of the catalyst-coat layer. Thereby, the catalyst becomes activated. Harmful substances, such as HC, NOx and CO included in the exhaust gases g are changed to $H_2O$, $N_2$ and $CO_2$ or the like by catalytic reaction. Further, the changed exhaust gases g are discharged from the exhaust pipe 8.

Thus, there is a need for heating promptly the catalyst-coat layer on the partition wall 3 to purify the exhaust gases g. Therefore, the partition wall 3 is formed thinly to rise the temperature thereof quickly after the engine of the vehicle is started. Further, there is also a need for forming thinly the partition wall 3 to reduce a pressure loss of the exhaust gases g.

Figure 3:
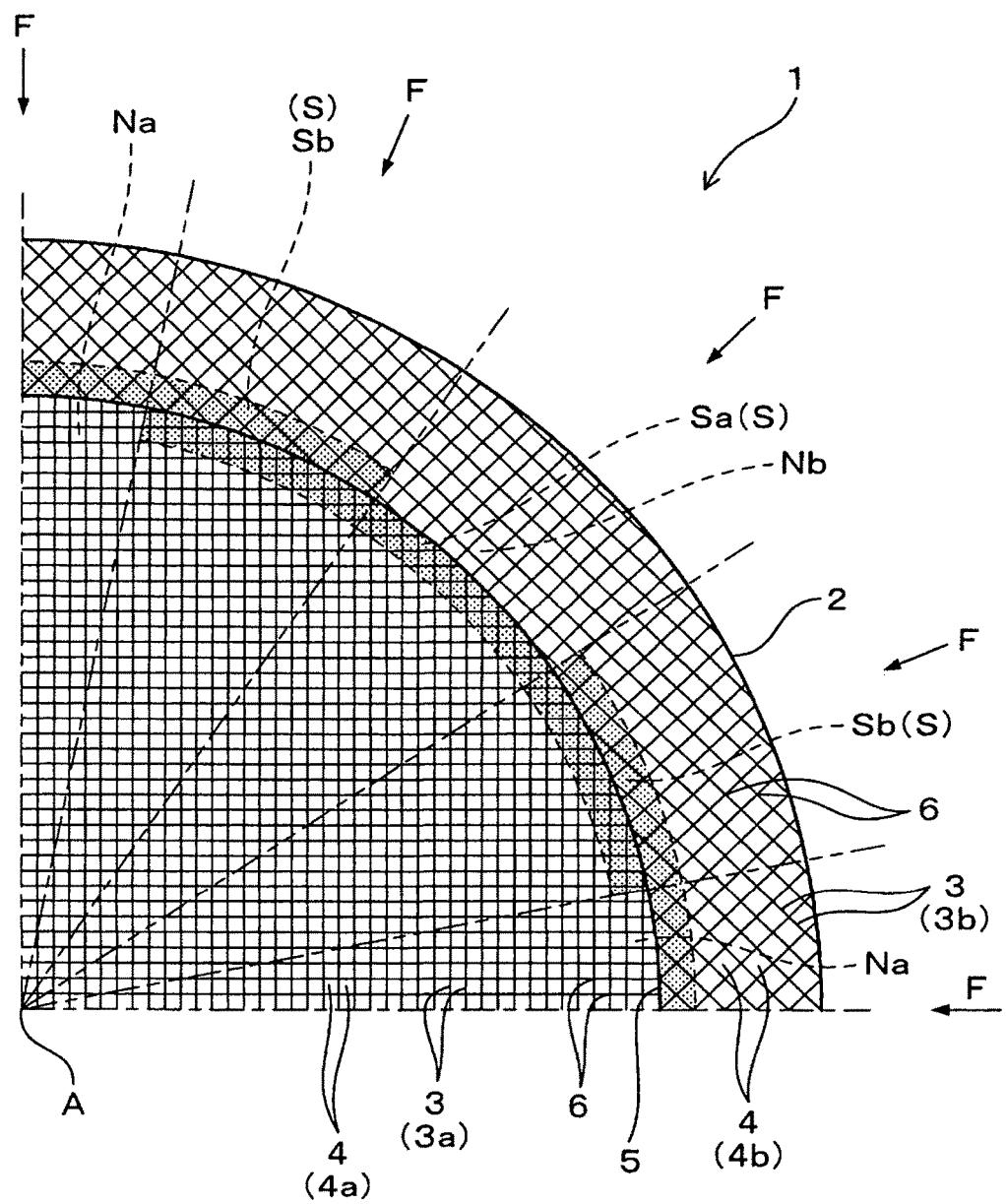
FIG. 3 is a partial enlarged sectional view of the honeycomb structure according to the first embodiment.

In addition, when a discharge rate of the exhaust gases g is high, the exhaust gases g easily flow in a central portion of the honeycomb structure 1. Therefore, if each of opening areas of the cells 4 is equalized, the exhaust gases g may mainly flow in the central portion of the honeycomb structure 1. Therefore, a velocity of the exhaust gases g passing through the central portion of the honeycomb structure 1 becomes high, and the exhaust gases g may flow in the honeycomb structure 1 without the catalyst purifying the harmful substances. Further, since the exhaust gases g flow intensively in the central portion of the honeycomb structure 1, the catalyst which is disposed on the central portion of the honeycomb structure may deteriorate excessively. To solve such problems, in the present embodiment, as shown in FIG. 3, two kinds of the cells 4 (i.e. the inner cell 4a and the outer cell 4b) are formed. Further, the opening area of an outer cell 4b is larger than that of an inner cell 4a. Thereby, a pressure loss of the outer cell 4b is reduced, and the exhaust gases g almost uniformly flow in the inner cells 4a and the outer cells 4b.

The separator 5 is disposed between respective regions having the inner cell 4a and the outer cell 4b. As shown in FIG. 4 to FIG. 6, so-called incomplete cells, which are surrounded by the partition walls 3 and the separator 5, are formed in the vicinity of the separator 5. Therefore, in particular, the external force F tends to concentrate on the partition walls 3 forming the separator 5.

In the present embodiment, the only intersection 6 disposed in the vicinity of the separator 5 is reinforced by reinforcing part 7 (refer to FIG. 4 to FIG. 6) as described above. As shown in FIG. 2, in the honeycomb structure 1, a reinforcing region S (which includes an inner reinforcing region Sa and an outer reinforcing region Sb) forming the reinforcing part 7 is disposed in the vicinity of the separator 5. The inner reinforcing region Sa is a region where the intersection 6 which is disposed in the vicinity of the separator 5 being opposite the central axis A is reinforced by the reinforcing part 7. The outer reinforcing region Sb is a region where the intersection 6 which is disposed in the vicinity of the separator 5 being opposite the outer skin 2 is reinforced by the reinforcing parts A. Intersections 6 which are disposed in regions being surrounded by the separator 5 except for the inner reinforcing region Sa are not reinforced by the reinforcing part 7. Further, intersections 6 which are disposed in regions which are disposed between the outer skin 2 and the separator 5 except for the outer reinforcing region Sb are not reinforced by the reinforcing part 7.

In the present embodiment, the two angles θ1 and θ2 (refer to FIG. 4 to FIG. 6) are formed by the radial direction of the outer skin 2 and the respective two partition walls 3 intersecting with each other. The smaller angle of the two angles θ1 and θ2 is larger than the predetermined angle $\theta_{th}$. In addition, the reinforcing part 7 is formed only on the intersection 6 which is disposed in the vicinity of the separator 5. That is to say, both angles formed by the radial direction of the outer skin 2 and the two partition walls 3 intersecting with each other are larger than the predetermined angle $\theta_{th}$. The radial direction of the outer skin 2 is a direction in which the external force F from outside of the honeycomb structure 1 acts. In addition, the only deformable intersection 6 formed by the two partition walls 3 is reinforced by reinforcing part 7 against the external force F. In other words, when an angle which is formed by the radial direction of the outer skin 2 and one of the two partition walls 3 intersecting with each other is smaller than the predetermined angle $\theta_{th}$, the intersection 6 formed by the two partition walls 3 is hardly deformable by receiving the external force F. Therefore, in this case, the intersection 6 is not reinforced by reinforcing part 7. Therefore, as shown in FIG. 3, there is a region of the intersection 6 not reinforced by the reinforcing part 7 in the vicinity of the separator 5. In the present embodiment, the predetermined angle $\theta_{th}$ is set to be 22.5°.

In addition, in the present embodiment, each of inner partition walls 3a forming the inner cells 4a is at an angle of 45° to a respective outer partition wall 3b forming the outer cell 4b. The inner partition wall 3a and the outer partition wall 3b are made up of the partition wall 3.

FIG. 4 and FIG. 5 are described below. FIG. 4 is a partial enlarged view showing only some of outer intersections 6b which are the intersections 6 formed by the outer partition walls 3b intersecting with each other and which are reinforced by the reinforcing parts 7. As shown in FIG. 4, the two angles θ1 and θ2 are formed by the radial direction of the outer skin 2 (i.e. the direction which the external force F acts) and the two outer partition walls 3b intersecting with each other. The two angles θ1 and θ2 are both larger than the predetermined angle $\theta_{th}$ (22.5°). Therefore, this outer partition wall 3b is easily influenced by the external force F. Accordingly, the intersection 6 (i.e. the outer intersection 6b) formed by the two outer partition walls 3b intersecting with each other is reinforced by the reinforcing part 7. The outer intersection 6b is easily influenced by the external force F and is disposed in the vicinity of the separator 5. Some of inner intersections 6a which are the intersections 6 formed by the inner partition walls 3a intersecting with each other are not reinforced by the reinforcing parts 7. The angle θ1 formed by one of the two inner partition walls 3a intersecting with each other and the radial direction of the outer skin 2 is approximately 0°. Therefore, the inner partition wall 3a may sufficiently withstand the external force F. Therefore, the inner partition wall 3a is hardly deformable. As a result, the inner intersection 6a is not reinforced by the reinforcing part 7.

FIG. 5 is a partial enlarged view showing both of the outer intersection 6b and the inner intersection 6a which are reinforced by the reinforcing parts 7. As shown in FIG. 5, the two angles θ1 and θ2 are formed by the radial direction of the outer skin 2 (i.e. the direction which the external force F acts) and the two outer partition walls 3b intersecting with each other. The two angles θ1 and θ2 are each larger than the predetermined angle $\theta_{th}$ (22.5°). Further, the two angles θ1 and θ2 are formed by the radial direction of the outer skin 2 and the two inner partition walls 3a are also respectively larger than the predetermined angle $\theta_{th}$ (22.5°). Therefore, both of the inner partition wall 3a and the outer partition wall 3b are easily influenced by the external force F. Therefore, both of the inner intersection 6a and the outer intersection 6b are reinforced by reinforcing parts 7. The inner intersection 6a and the outer intersection 6b are especially easily influenced by the external force F and are disposed in the vicinity of the separator 5.

FIG. 6 is a partial enlarged view showing the only inner intersection 6a which is reinforced by the reinforcing part 7. As shown in FIG. 6, the two angles θ1 and θ2 are formed by the radial direction of the outer skin 2 and the two inner partition walls 3a intersecting with each other. The two angles θ1 and θ2 are each larger than the predetermined angle $\theta_{th}$ (22.5°).

Therefore, the inner partition wall 3a is easily influenced by the external force F. As a result, the intersection 6 (i.e. the inner intersection 6a) formed by the two inner partition walls 3a intersecting with each other is reinforced by the reinforcing part 7. The inner intersection 6a is especially easily influenced by the external force F and is disposed in the vicinity of the separator 5. Further, the outer intersection 6b is not reinforced by the reinforcing part 7. The angle θ1 formed by the radial direction of the outer skin 2 and one of the two outer partition walls 3b intersecting with each other is approximately 0°. Therefore, the outer partition wall 3b may sufficiently withstand the external force F. Therefore, the outer partition wall 3b is hardly deformable. As a result, the outer intersection 6b is not reinforced by the reinforcing part 7.

In the present embodiment, the predetermined angle $\theta_{th}$ is set to be 22.5° (=90°/4) as described above. An angle region in a circumferential direction of the outer skin 2 is divided for every 90 degrees around the central axis A. In addition, the divided angle region in the circumferential direction of the outer skin 2 which is disposed in the vicinity of the separator 5 being opposite the outer skin 2 is defined as a region A. The region A has an outer non-reinforcing region Nb and an outer reinforcing region Sb. In the region A, the outer non-reinforcing region Nb is the angle region in the circumferential direction of the outer skin 2 which is divided for 22.5° around the central axis A. In the region A, the outer reinforcing region Sb is the angle region in the circumferential direction of the outer skin 2 which is divided for 67.5° around the central axis A. As shown in FIG. 2, the outer non-reinforcing region Nb is also a region where the outer intersection 6b is not reinforced by the reinforcing part 7. Further, the outer reinforcing region Sb is also a region where the outer intersection 6b is reinforced by the reinforcing part 7. It is defined that a pattern is that the region A has the outer non-reinforcing region Nb and the outer reinforcing region Sb. Four above-described patterns occur at various points across the full 360 degrees of the circumferential direction of the honeycomb structure 1. Therefore, the two outer reinforcing regions Sb are disposed in a point symmetrical position with respect to the central axis A. Further, the two outer non-reinforcing regions Nb are disposed in the point symmetrical position with respect to the central axis A. Therefore, the outer reinforcing regions Sb and the outer non-reinforcing regions Nb both have high symmetries.

When the predetermined angle $\theta_{th}$ is set to be 22.5° (=90°/4), the two inner reinforcing regions Sa are disposed at point symmetrical positions with respect to the central axis A. Further, an inner non-reinforcing region Na is a region of the intersection 6 which is disposed in the vicinity of the separator 5 which is opposite the central axis A. The two inner non-reinforcing regions Na, which are reinforced by the reinforcing parts 7, are disposed at point symmetrical positions with respect to the central axis A. As a result, the inner reinforcing regions Sa and the inner non-reinforcing regions Na have respectively high symmetries.

In the present embodiment, the inner partition wall 3a is inclined at 45° with respect to the outer partition wall 3b. A slope when the inner non-reinforcing regions Na are assumed to be approximately linear in a shape is defined as a slope A. A slope when the outer non-reinforcing regions Nb are assumed to be approximately linear in a shape is defined as a slope B. Therefore, an angle formed by the slope A and the slope B is 45°. That is to say, the inner non-reinforcing region Na is disposed between the two outer non-reinforcing regions Nb on the separator 5. Therefore, a shape of the honeycomb structure 1 has a high symmetry as a whole.

A functional effect of the present embodiment is described below. As shown in FIG. 4 to FIG. 6, the two angles θ1 and θ2 are formed by the radial direction of the outer skin 2 and the two partition walls 3. The smaller angle of the two angles θ1 and θ2 is larger than the predetermined angle $\theta_{th}$. Further, the reinforcing part 7 is formed only on the intersection 6 which is disposed in the vicinity of the separator 5 in addition to the above conditions. Therefore, while the number of the reinforcing parts is reduced, the strength of the partition wall 3 may be enhanced. That is to say, when the external force F from outside of the honeycomb structure 1 acts on one of the two partition walls 3 forming the above-described two angles approximately in parallel with the one, the two partition walls 3 are hardly deformed. The two partition walls 3 also intersect each other. However, when a direction in which the external force F from outside of the honeycomb structure 1 acts crosses obliquely with either of the two partition walls 3 intersecting with each other, the two partition walls 3 are easily deformed. In addition, the external force F tends to concentrate on the partition wall 3 in the vicinity of the separator 5. That is to say, the partition wall 3 in the vicinity of the separator 5 which crosses obliquely with the direction on which the external force F from outside of the honeycomb structure 1 acts is particularly weak against the external force F. As a result, when the reinforcing part 7 is formed only on the intersection 6 in the vicinity of the separator, which is formed by intersecting the two partition walls 3 each other, the strength of the only deformable partition wall 3 may be enhanced. The respective two partition walls 3 intersecting with each other relative to the direction on which the external force F acts (i.e. the radial direction of the outer skin) are arranged so as to intersect each other at the angle larger than the predetermined angle $\theta_{th}$. Therefore, while minimizing the number of the reinforcing parts 7, the strength of the partition wall 3 may be enhanced sufficiently.

Figure 16:
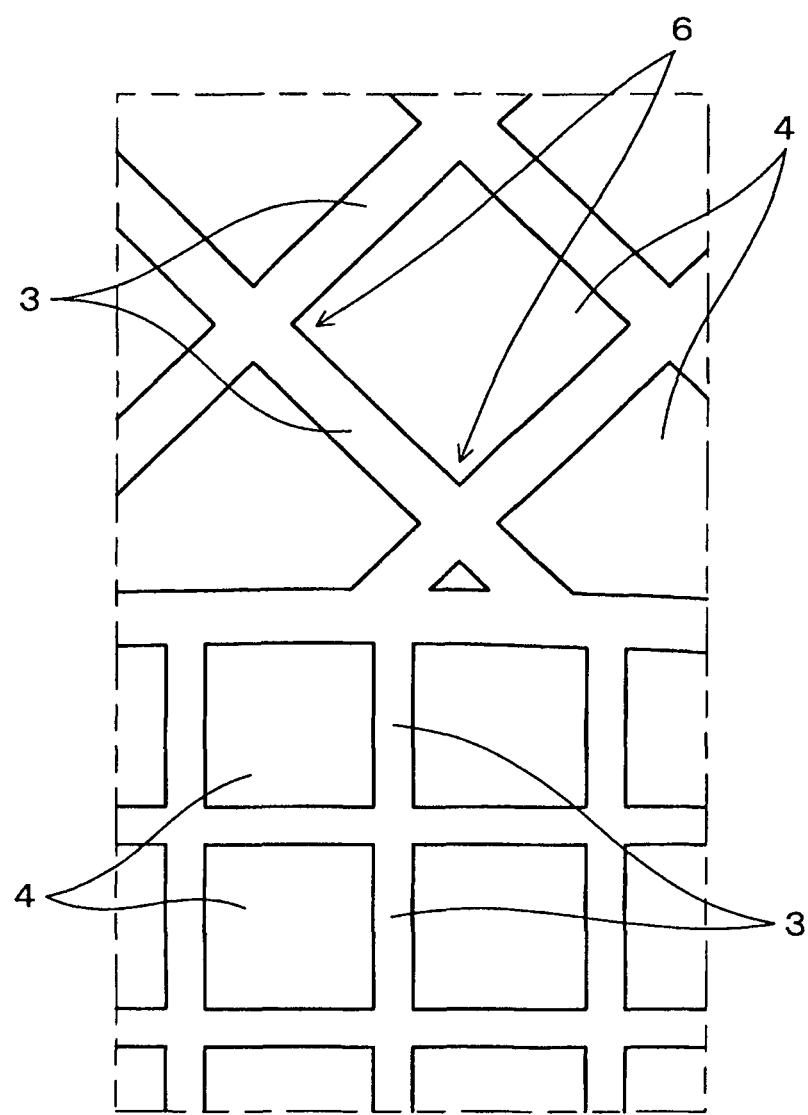
FIG. 16 is a partial enlarged sectional view of a honeycomb structure after molding according to a comparative example.
Figure 17:
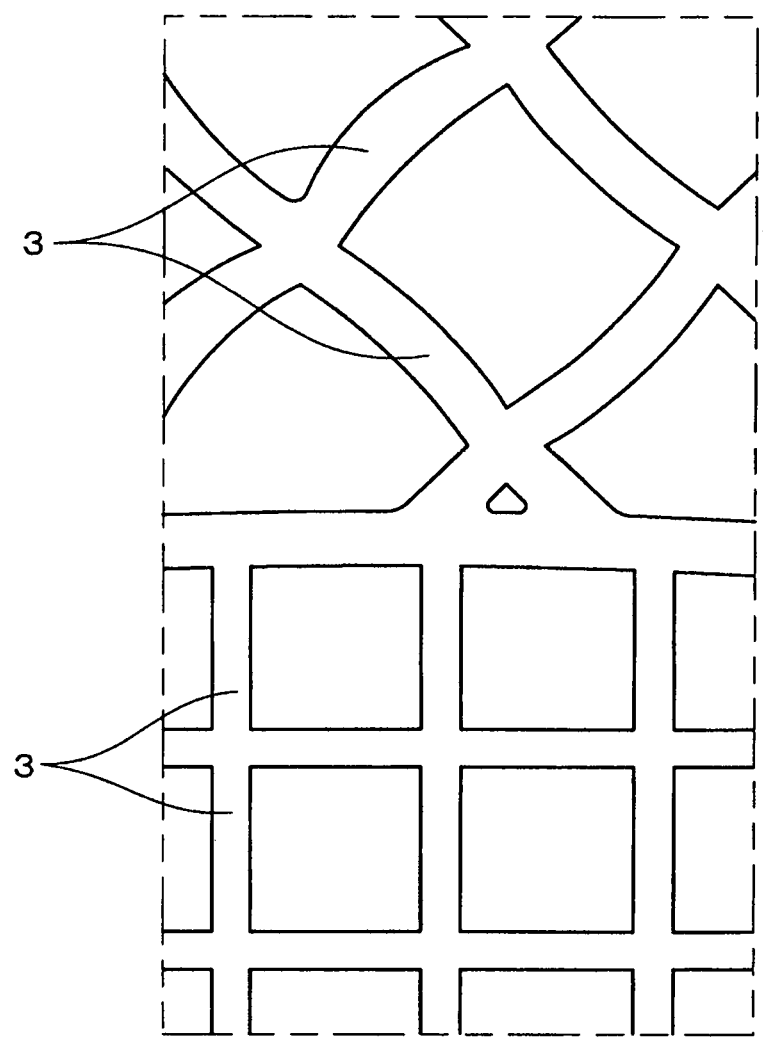
FIG. 17 is a partial enlarged sectional view of the honeycomb structure receiving an external force after molding according to the comparative example.

If the intersection 6 is not reinforced by the reinforcing part 7, there is a need for increasing a thickness of the partition wall 3 and reducing a porosity of the partition wall 3 to enhance the strength of the partition wall 3. When the porosity of the partition wall 3 is reduced, a weight of the honeycomb structure 1 is increased and the purifying performance which purifies the exhaust gases g is degraded. Further, when the thickness of the partition wall 3 is increased, a yield ratio of the honeycomb structure 1 may be reduced. That is to say, when the honeycomb structure 1 is produced, water is added to a powder, such as cordierite, to make the powder into a clay-like material. After extruding the clay-like material by a mold, the clay-like material is fired. However, at the time of extrusion so that the thickness of the partition wall 3 is increased and the partition wall 3 becomes heavy, the partition wall 3 may deform due to its own weight before firing (refer to FIG. 16 and FIG. 17). Therefore, there is a risk that the yield ratio of the honeycomb structure 1 is reduced.

In addition, in the honeycomb structure 1, the incomplete cells, which are surrounded by the partition walls 3 and the separator 5, are formed in the vicinity of the separator 5. Therefore, when the thickness of the partition wall 3 is increased, a problem that the incomplete cells are made small occurs. Therefore, the incomplete cells are easily buried by a catalyst layer. That is to say, after the honeycomb structure 1 is produced, the following step is conducted by a catalyst manufacturer or the like. In the following step, the honeycomb structure 1 is immersed in a slurry including the noble metal. Thereby, the slurry is applied to the surface of the partition wall 3. After that, the catalyst layer is formed on the surface of the partition wall 3 by drying. Therefore, when the honeycomb structure 1 is immersed in the slurry in a state that the incomplete cells are small, there is a risk that the incomplete cells are buried by the catalyst layer. The exhaust gases g may not flow in the incomplete cells. Therefore, there is a risk that a purifying rate of the exhaust gases g is reduced and the catalyst layer which is buried in the incomplete cells becomes useless.

In addition, when the thickness of the partition wall 3 is increased, there is a need for forming an opening part of the mold used at the time of the extrusion to be wide. A configuration of the opening part of the mold corresponds with that of the partition wall 3, and an intermediate article of the partition wall 3 is extruded from the opening part of the mold. Therefore, more raw material of the honeycomb structure 1 are needed during molding to form a wide mold opening. Further, a velocity difference at the time of the extrusion, between the partition wall 3 and a portion except for the partition wall 3, may be caused. Therefore, the opening part of the mold whose configuration corresponds with that of the partition wall 3 is easy to be blocked every time extrusion is performed. Therefore, a failure is easily caused at the time of extrusion.

Thus, when the thickness of the partition wall 3 is increased and the porosity of the partition wall 3 is reduced, various problems occur. However, as in the present embodiment, two angles $\theta 1$ and $\theta 2$ are formed by the radial direction of the outer skin 2 and the respective two partition walls 3 intersecting with each other. The smaller angle of the two angles $\theta 1$ and $\theta 2$ is larger than a predetermined angle $\theta_{th}$. Further, the reinforcing part 7 is formed only on the intersection 6 which is disposed in the vicinity of the separator 5 in addition to the above condition. Thereby, the partition wall 3 may be made thinly and the porosity of the partition wall 3 may be increased and the strength of the partition wall 3 may be increased. Therefore, the above-described various problems may be suppressed from occurring.

In addition, in the present embodiment, the separator 5 has a cylindrical shape. Further, the predetermined angle $\theta_{th}$ is set to be 22.5°. Therefore, as shown in FIG. 2, the two outer reinforcing regions Sb are disposed in the point symmetrical position with respect to the central axis A. Further, the two inner reinforcing regions Sa are disposed in the point symmetrical position with respect to the central axis A. Therefore, the shape of the honeycomb structure 1 has high symmetry as a whole. When the shape of the honeycomb structure 1 has a low symmetry, a velocity with which the raw material flows in a flow channel in the mold for forming the low-symmetry honeycomb structure 1 at the time of the extrusion becomes easily uneven as a whole. Therefore, the raw material after extruding may not be molded into a shape identical to a shape of the mold for forming the low-symmetry honeycomb structure 1. Accordingly, shape failure and deformation of the partition walls 3 of the low-symmetry honeycomb structure 1 thus produced easily occur. On the other hand, as in the present embodiment, the high-symmetry honeycomb structure 1 allows the above-described problem to hardly occur.

In addition, as shown in FIG. 2, in the present embodiment, the inner partition wall 3a is inclined at 45° with respect to the outer partition wall 3b. Therefore, each of the above-described slope A and the above-described slope B is 45°. As a result, the inner non-reinforcing region Na may be disposed between the two outer non-reinforcing regions Nb on the separator 5. Therefore, the symmetry of the honeycomb structure 1 may be further enhanced.

Figure 12:
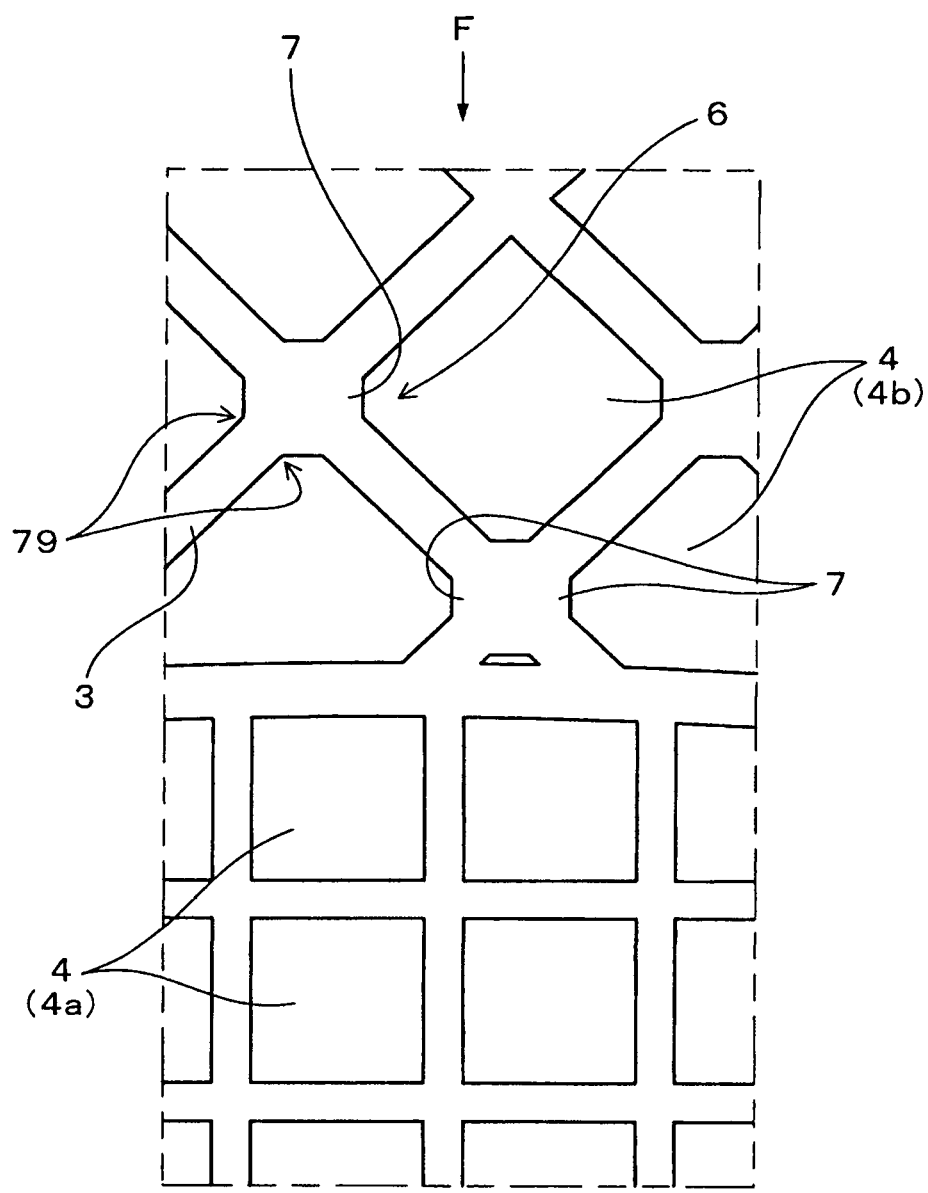
FIG. 12 is a partial enlarged sectional view of a honeycomb structure according to a second embodiment of the present disclosure.

In addition, in the present embodiment, as shown in FIG. 4, the reinforcing part 7 has a rounded shape. Therefore, the partition wall 3 does not receive a large stress. As shown in FIG. 12, the reinforcing part 7 may also have a non-rounded shape. However, in this case, a crossing portion 79 where the reinforcing part 7 and the partition wall 3 are crossed easily receives stress. On the other hand, in the present embodiment, the reinforcing part 7 which has a rounded shape hardly receives stress locally. Therefore, the strength of the honeycomb structure 1 may be further enhanced.

Figure 11:
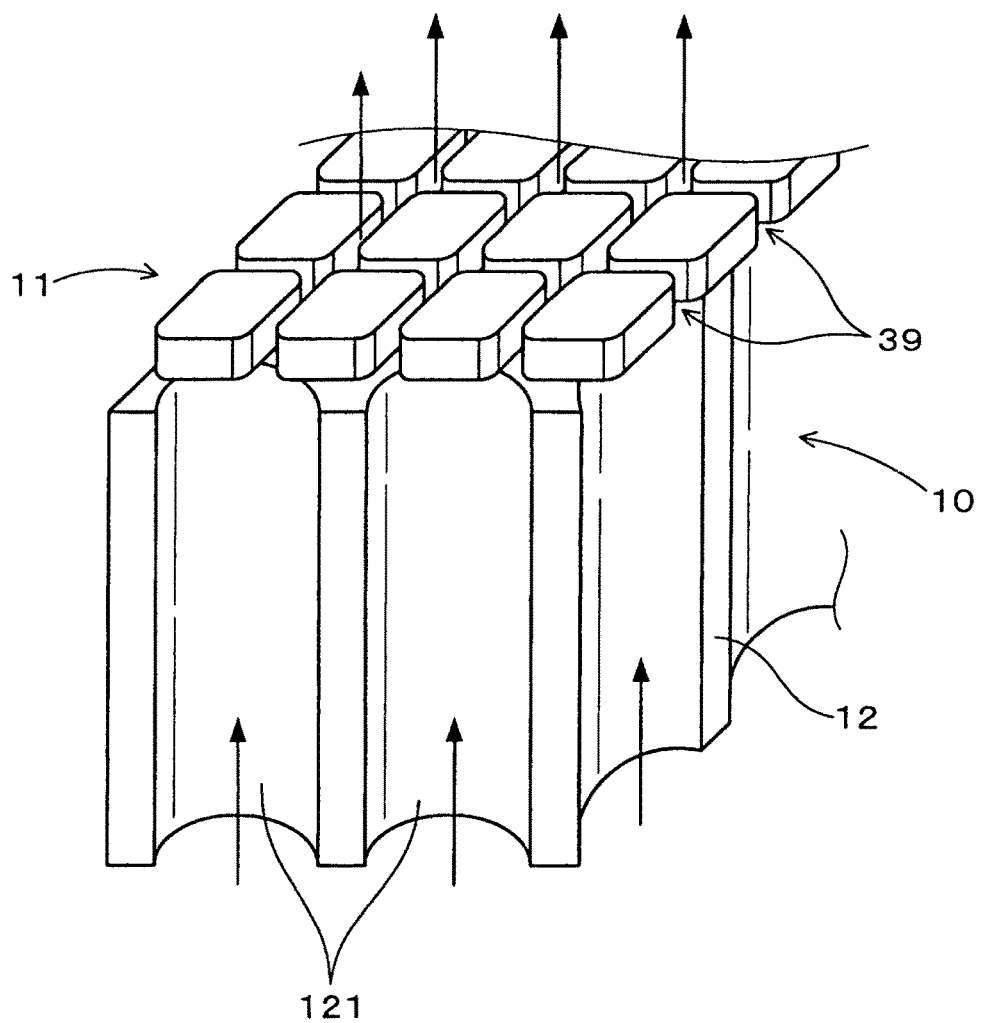
FIG. 11 is a partial perspective view of the mold for forming the honeycomb structure according to the first embodiment.

In addition, when the reinforcing part 7 has the rounded shape, a mold 10 of the honeycomb structure 1 is easily produced. A reason for this is described below. As shown in FIG. 11, the mold 10 has plate-like parts 11 and a holding portion 12 which holds the plate-like parts 11. A configuration of each of slits 39 corresponds with that of the partition wall 3 or the like, and the respective slits 39 are formed between the plate-like parts 11. Further, a plurality of holes 121 are formed penetrating the holding portion 12. The raw material of the honeycomb structure 1 is injected into the holes 121 and is extruded from the slits 39. Thereby, the honeycomb structure 1 is produced.

Figure 9:
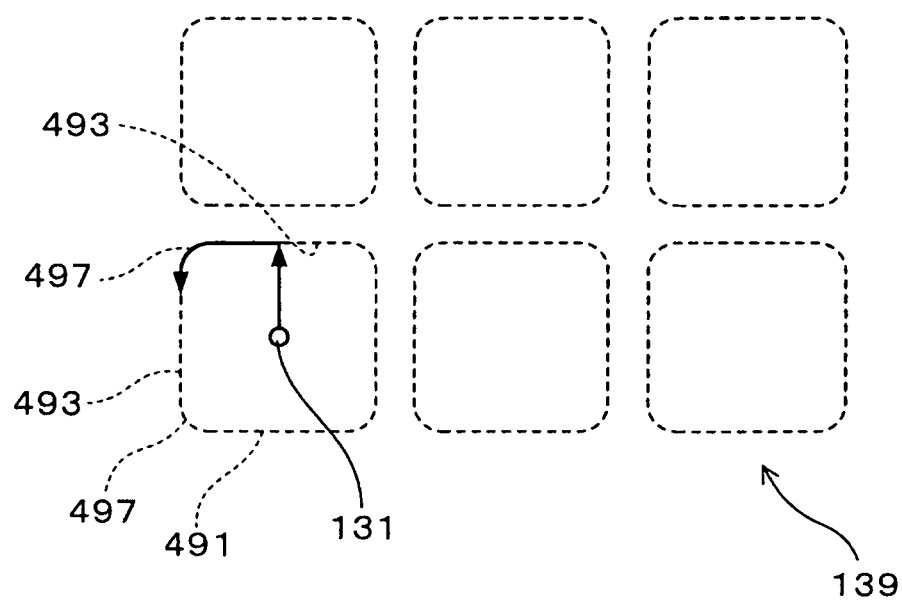
FIG. 9 is an explanation drawing which illustrates a production process of the electrode according to the first embodiment.

When the mold 10 is produced, first, an electrode 13 (refer to FIG. 8) is formed. A plurality of through-holes 49 are formed penetrating the electrode 13. A configuration of each of the through-holes 49 corresponds with that of the cell 4. When the electrode 13 is formed, as shown in FIG. 9, a metallic plate 139 is prepared, and a pore 131 is formed penetrating the metallic plate 139 with a drill or the like. A not shown wire is inserted to the pore 131. The wire is heated by applying an electrical current thereto. The pore 131 is surrounded by each of lines to be cut 491. The heated wire is moved from the pore 131 to the lines to be cut 491 and is moved along each of the lines to be cut 491 while penetrating the metallic plate 139. Thereby, the through-holes 49 are formed.

Figure 10:
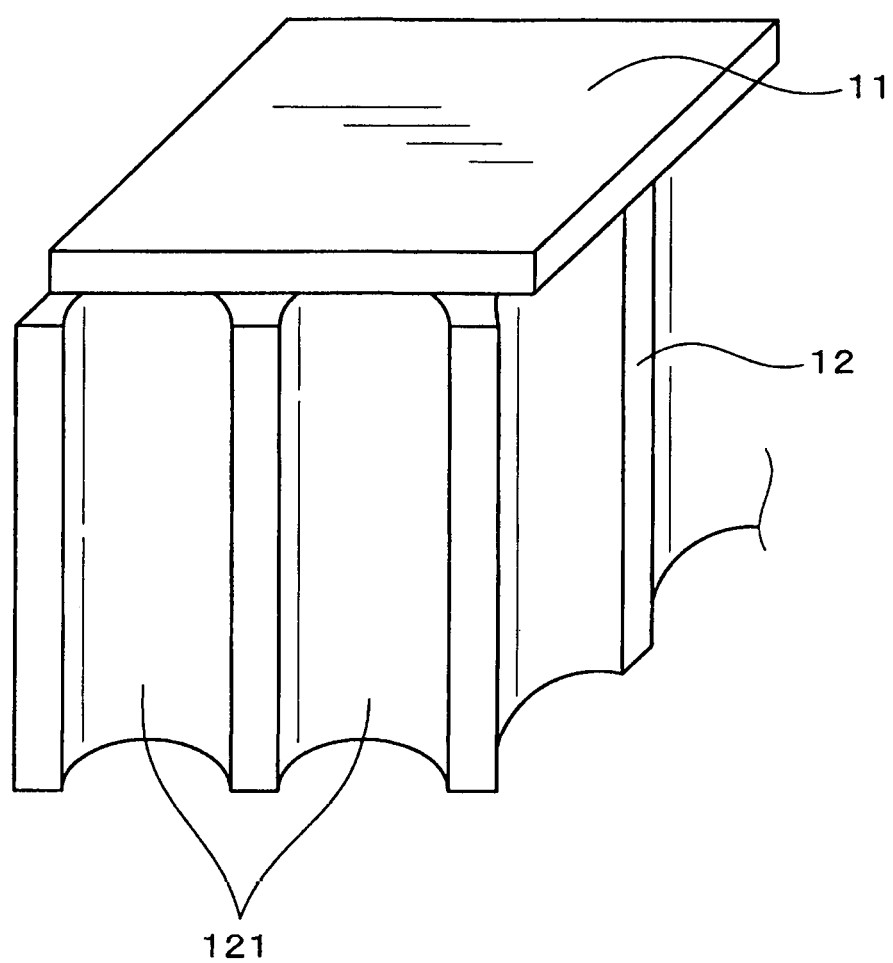
FIG. 10 is a partial perspective view of a mold for forming the honeycomb structure in a middle of a production process according to the first embodiment.

After that, as shown in FIG. 10, the rough plate-like parts 11 which are mounted on the holding portion 12 are prepared. Then, the electrode 13 performs electric discharge machining to the rough plate-like parts 11. Thereby, penetrating patterns, which penetrate through the electrode 13, obtained by inverting a concavo-convex shape having the electrode 13 are formed on the transferred rough plate-like parts 11. Thus, the mold 10 is formed (refer to FIG. 11).

When the electrode 13 is formed, the heated wire is moved along each of the lines to be cut 491 while penetrating the metallic plate 139 as described above. In this case, as shown in FIG. 9, a shape of each of parts 497 is corresponded with that of the reinforcing part 7. Further, a shape of each of parts 493 is corresponded with that of the partition wall 3. Thereby, the wire may be moved from the part 493 to the part 497 while penetrating the metallic plate 139 so that a speed to move the wire does not largely decrease. In addition, when the part 497 has a rounded shape, the wire at the time of cutting the metallic plate 139 is unlikely to receive stress or be cut. Therefore, the through-hole 49 formed penetrating the electrode 13 is easily formed.

Thus, the present embodiment can provide the honeycomb structure which can secure high strength, be capable of suppressing the size and the weight from increasing, and be capable of suppressing the pressure loss of the exhaust gases from excessively rising.

In addition, in the present embodiment, the predetermined angle $\theta_{th}$ is set to be 22.5°. However, the present embodiment is not limited to this. For example, the predetermined angle $\theta_{th}$ may be set to an arbitrary a value between from 5° to 40°.

Second Embodiment

Among reference numerals used in the figures related to the following example, the same reference numerals as in Example 1 are used, unless otherwise indicated, represent the same constituent elements as Example 1.

The present embodiment is an example of changing a configuration of a reinforcing part 7. As shown in FIG. 12, in the present embodiment, the reinforcing part 7 has a non-rounded shape. The rest of the non-rounded shape of the reinforcing part 7, the reinforcing part 7 in the present embodiment has the same configuration and effects as in embodiment 1.

Third Embodiment

Figure 13:
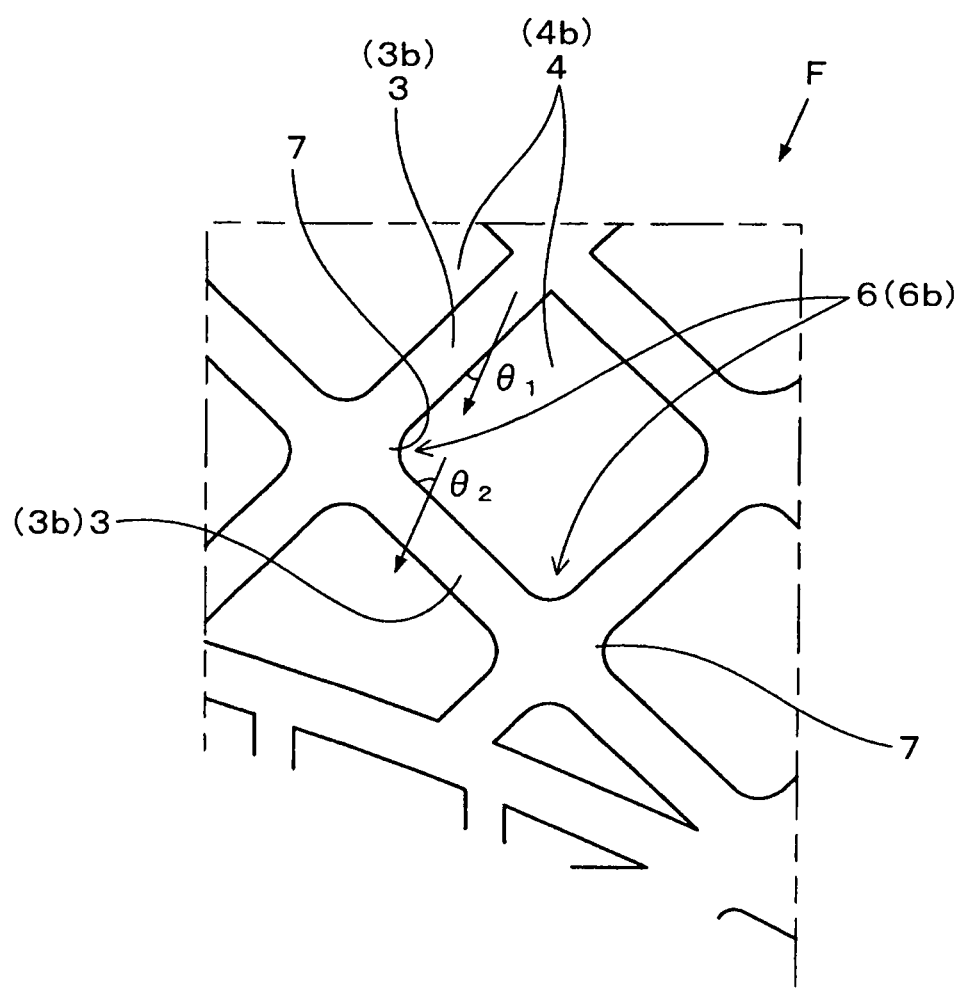
FIG. 13 is a partial enlarged sectional view of a region including a reinforcing part whose area is close to a minimum in a honeycomb structure according to a third embodiment of the present disclosure.
Figure 14:
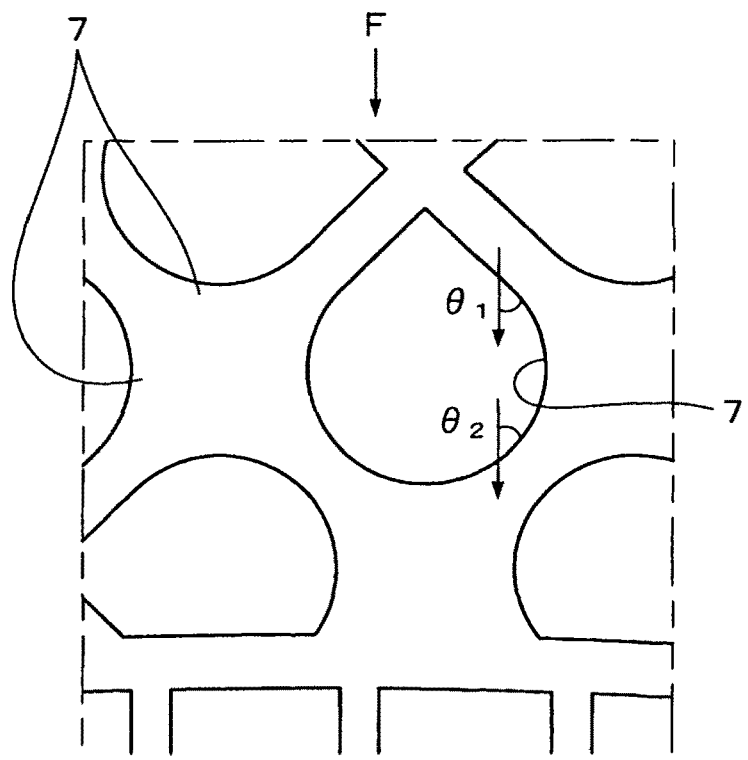
FIG. 14 is a partial enlarged sectional view of a region including the reinforcing part whose area is close to a maximum in the honeycomb structure according to the third embodiment.

The present embodiment is an example of changing an area of a reinforcing part 7 by location. As shown in FIG. 13, in the present embodiment, two angles $\theta 1$ and $\theta 2$ are formed by a radial direction of an outer skin 2 and respective two partition walls 3 intersecting with each other. When a smaller angle of the two angles $\theta 1$ and $\theta 2$ is approximately predetermined angle $\theta_{th}$ (22.5°), the area of the reinforcing part 7 when viewed in an axis direction of honeycomb structure is minimized. Further, as shown in FIG. 14, when the smaller angle of the two angles $\theta 1$ and $\theta 2$ is approximately 45°, the area of the reinforcing part 7 is maximized.

Figure 15:
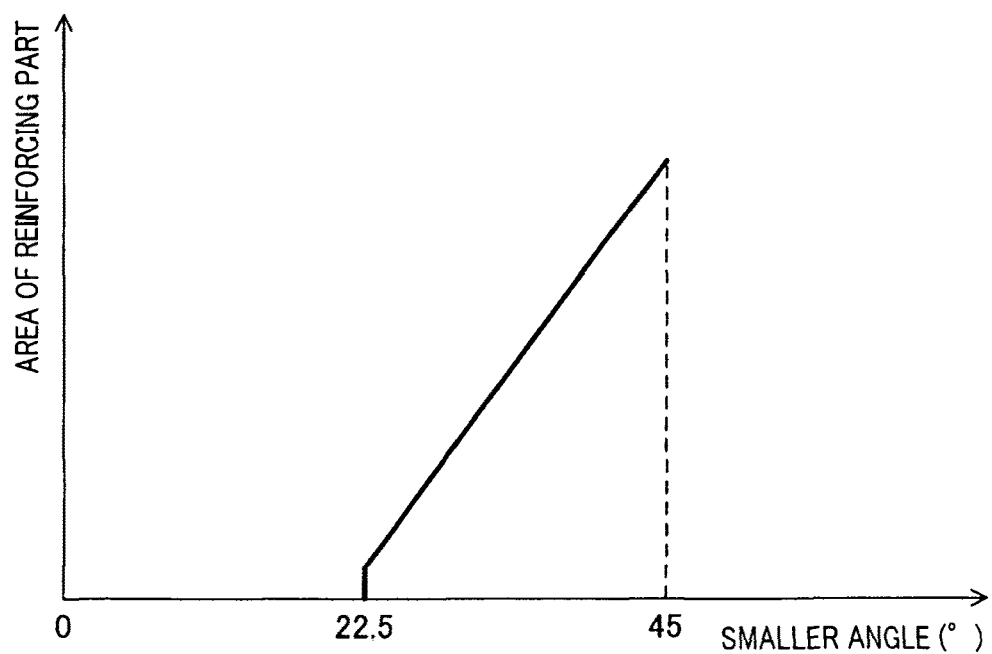
FIG. 15 is a graph showing relations between the area of the reinforcing part and a smaller angle of the two angles which are formed by a radial direction of an outer skin and respective partition walls according to the third embodiment.

FIG. 15 is a pattern graph showing relations between the area of the reinforcing part and the smaller angle of the two angles $\theta 1$ and $\theta 2$. As shown in FIG. 15, in the present embodiment, the area of the reinforcing part 7 becomes gradually larger as the smaller angle of the two angles $\theta 1$ and $\theta 2$ increases from 22.5° to 45°.

An effect of the present embodiment is described below. A part of the partition wall 3 forming the smaller angle of the two angles $\theta 1$ and $\theta 2$ nears 22.5° (i.e. a part of the partition wall 3 which is relatively strong against an external force F) is defined as a part A. In the above-described configuration, the part A may reinforce the reinforcing part 7 whose area is minimized. Therefore, a weight of a honeycomb structure 1 may be further reduced. The part of the partition wall 3 forming the smaller angle of the two angles $\theta 1$ and $\theta 2$ nears 45° (i.e. a part of the partition wall 3 which is weak against the external force F) is defined as a part B. The part B may reinforce the reinforcing part 7 whose area is maximized. Therefore, a strength of the honeycomb structure 1 may be further enhanced. The rest of the area of the reinforcing part 7 in the present embodiment has the same configuration and effects as in Example 1.

What is claimed is:

1. A honeycomb structure, which purifies exhaust gases, comprising:
   an outer skin;
   a plurality of partition walls formed inside of the outer skin, the plurality of partition walls being arranged in a quadrangle lattice; and
   a plurality of cells which forms flow channels for the exhaust gases,
   wherein the plurality of the cells is divided into inner cells and outer cells, the inner cells being formed in a region which is an inner part of the honeycomb structure, and which includes a central axis of the outer skin, the outer cells being disposed outside of the region where the inner cells are formed, and
   an opening area of each outer cell is larger than the opening area of each inner cell, and a separator is disposed between the region where the inner cells are formed and the region where the outer cells are formed,
   wherein a plurality of intersections is formed by two partition walls intersecting with each other, the plurality of intersections is disposed inside of the outer skin, and a reinforcing part is formed on some intersections of the plurality of intersections,
   wherein the reinforcing part is formed only on the intersections disposed within a predetermined distance from the separator, in the intersections on which the reinforcing part is formed, those intersections satisfy a condition that two respective angles are formed by two respective partition walls intersecting with a radial direction of the outer skin and a smaller angle of the two angles is larger than a predetermined angle of 22.5°.

2. A honeycomb structure as set forth in claim 1, wherein the intersections on which the reinforcing part is formed have a concave, curved line at an interior corner.

3. A honeycomb structure as set forth in claim 1, wherein
when the smaller angle of the two angles which are formed by the two respective partition wall intersecting with the radial direction of the outer skin is approximately 22.5°, an area of the reinforcing part when viewed in an axis direction of the honeycomb structure is minimized, when the smaller angle of the two angles is approximately 45°, the area of the reinforcing part when viewed in the axis direction of the honeycomb structure is maximized, and as the smaller of the two angles increases from 22.5° to 45°, the area of the reinforcing part when viewed in the axial direction of the honeycomb structure increases.

* * * * *